US005483398A

United States Patent [19]
Boutaghou

[11] Patent Number: 5,483,398
[45] Date of Patent: Jan. 9, 1996

[54] COMPLIANT VIBRATION ISOLATION HOUSING ASSEMBLY FOR A DATA STORAGE SYSTEM

[75] Inventor: Zine-Eddine Boutaghou, Rochester, Minn.

[73] Assignee: International Business Machines Corporation, Armonk, N.Y.

[21] Appl. No.: 334,200

[22] Filed: Nov. 4, 1994

[51] Int. Cl.⁶ .................................................. G11B 33/14
[52] U.S. Cl. ........................................................ 360/97.02
[58] Field of Search .................... 369/263; 360/97.02, 360/97.01

[56] References Cited

U.S. PATENT DOCUMENTS

| | | | |
|---|---|---|---|
| 4,117,997 | 10/1978 | Gitzendanner . | |
| 4,384,750 | 5/1983 | Hager ............................ | 312/8 |
| 4,553,183 | 11/1985 | Brown et al. ........................ | 360/97.02 |
| 4,647,803 | 3/1987 | von der Heide et al. ................. | 310/51 |
| 4,896,231 | 1/1990 | Hoppe ................................... | 360/97.02 |
| 5,214,549 | 5/1993 | Baker et al. ........................... | 360/97.02 |
| 5,223,996 | 6/1993 | Read et al. ............................ | 360/97.02 |
| 5,282,100 | 1/1994 | Tacklind et al. ...................... | 360/97.02 |
| 5,282,101 | 1/1994 | Reinisch ................................ | 360/97.02 |

FOREIGN PATENT DOCUMENTS

| | | |
|---|---|---|
| 5-198080 | 8/1993 | Japan . |
| 5-198081 | 8/1993 | Japan . |
| 5-198082 | 8/1993 | Japan . |

OTHER PUBLICATIONS

IBM Technical Disclosure Bulletin, Hard Disk Drive, vol. 32, No. 12, May 1990, p. 30.
IBM Technical Disclosure Bulletin, Thermally Compensated Head Disk Assembly Frame for Rotary Actuator Disk Files, vol. 30, No. 10, Mar. 1988, pp. 450–451.

*Primary Examiner*—John H. Wolff
*Attorney, Agent, or Firm*—Merchant, Gould, Smith, Edell, Welter & Schmidt

[57] ABSTRACT

A vibration isolation apparatus and method for attenuating internal and external vibrations impinging on a data storage system housing is disclosed. A spindle motor assembly is mounted to a secondary base which is decoupled from a primary base of the housing. A compliant member is disposed between the secondary base and primary base which attenuates spindle motor induced vibrations that would otherwise be transmitted to the primary base and the actuator assembly. The actuator assembly may be mounted to a tertiary base which is also isolated from the primary base by a compliant member. The novel vibration isolation also provides for the dampening of external shock vibrations impinging on the housing and spindle motor assembly of the data storage system. An injection molding process is preferably employed to fabricate the novel data storage system housing base.

20 Claims, 12 Drawing Sheets

| TABLE ACCELERATION (g) | HOUSING BASE ACCELERATION (g) | SPINDLE MOTOR ASSEMBLY ACCELERATION (g) |
| --- | --- | --- |
| 100 | 110 | 105 |
| 200 | 400 | 490 |
| 400 | 900 | 1600 |

FIG. 4

COMPLIANT VIBRATION ISOLATION HOUSING ASSEMBLY FOR A DATA STORAGE SYSTEM

FIELD OF THE INVENTION

The present invention relates generally to data storage systems, and, more particularly, to a method and apparatus for attenuating mechanical and acoustic vibrations in a data storage system housing.

BACKGROUND OF THE INVENTION

A typical data storage system includes one or more data storage disks coaxially mounted on a hub of a spindle motor. The spindle motor rotates the disks at speeds typically on the order of several thousand revolutions-per-minute (RPM). Digital information, representative of various types of data, is typically written to and read from the data storage disks by one or more transducers, or read/write heads, which are mounted to a rotatably mounted actuator and pass over the surface of the rapidly spinning data storage disks.

The actuator typically includes a plurality of outwardly extending actuator arms, with one or more read/write transducer assemblies being mounted resiliently or rigidly on the extreme end of the actuator arms. The actuator arms are interleaved into and out of the stack of rotating disks, typically by means of a coil assembly mounted to the actuator. The coil assembly generally interacts with a permanent magnet structure, and the application of current to the coil assembly in one polarity causes the actuator arms and transducers to shift in one direction, while current of the opposite polarity shifts the actuator arms and transducers in an opposite direction.

In a typical digital data storage system, digital data is stored in the form of magnetic transitions on a series of concentric, closely spaced tracks comprising the surface of the magnetizable rigid data storage disks. The tracks are generally divided into a plurality of sectors, with each sector comprising a number of information fields. One of the information fields is typically designated for storing data, while other fields contain sector identification and synchronization information, for example. Data is transferred to, and retrieved from, specified track and sector locations by the actuator arms and transducers being shifted from track to track, typically under the control of a controller. The transducer assembly typically includes a read element and a write element.

Writing data to a data storage disk generally involves passing a current through the write element of the transducer assembly to produce magnetic lines of flux which magnetize a specific location of the disk surface. Reading data from a specified disk location is typically accomplished by the read element of the transducer assembly sensing the magnetic field or flux lines emanating from the magnetized locations of the disk. As the read element moves over the rotating disk surface, the interaction between the read element and the magnetized locations on the disk surface result in electrical pulses being induced in the read element, thereby indicating transitions in the magnetic field.

It can readily be appreciated that the process of precisely aligning and positioning the transducers over specified disk locations can be adversely affected by vibrations and shocks imparted to, and produced within, the housing of a data storage system. Vibrations from a number of internal and external sources are typically transmitted along the data storage system housing and impinge upon the sensitive system components mounted to the housing. Displacement of a support table or other structure upon which the data storage system is situated, for example, often induces a measurable amount of acceleration in the support structure. A corresponding, but typically amplified, acceleration is transmitted through the housing and the sensitive internal components of the data storage system, such as the spindle motor assembly and the actuator/transducer assembly.

The accelerations imparted to a table or other structure supporting a data storage system typically results in the production of significantly amplified vibrations that are transmitted through the base portion of the housing and other structures coupled to the housing base, such as the spindle motor assembly. The relatively high levels of structural vibration resulting from external housing accelerations and impinging on the spindle motor assembly have been identified as contributing to a number of data storage system maladies, including significant track misalignment errors when reading and writing data to the disks, inaccuracies when reading servo information for locating and aligning the read/write transducers over specified track and sector locations, and an appreciable reduction in the service life of the spindle motor.

Dropping and bumping the data storage system can also dramatically affect the performance and service life of a data storage system. Such mishandling of the data storage system typically results in the production of short duration shock vibrations within the system housing. These short duration shocks are generally associated with appreciable levels of induced housing accelerations which can severally impact the operation and service life of the spindle motor assembly and actuator/transducer assembly. The housing base and other structures that are mechanically coupled to the base typically amplify the detrimental shock vibrations which can cause varying degrees of damage to the data storage system's sensitive components. It is noted that dropping a data storage system on its edge, for example, typically results in the production short duration shock vibrations that impinge on the internal components and structures from a multiplicity of directions.

The vibrations that can adversely affect the performance of the spindle motor and actuator/transducer assembly are generally associated with undesirable levels of acoustic emissions emanating from the housing of the data storage system. The spindle motor, generally rotating at rates on the order of four to five thousand RPM, typically produces mechanically and electrically induced vibrations which are transmitted through the base of the housing and the housing cover. The data storage system housing base, and in particular, the housing cover, greatly amplify the spindle motor excitation vibrations resulting in the production of an appreciable level of undesirable acoustic noise. It is noted that, in general, the operation of the actuator voice coil motor also results in the production and transmission of undesirable vibrations through the data storage system housing, and contributes to the acoustic noise generated by a conventional data storage system.

Various methods and apparatus have been employed in conventional data storage systems in an attempt to dampen external and internal vibrations and accelerations. Such prior art schemes typically employ elastomeric pads or bumpers in an effort to attenuate external vibrations transmitted to the data storage system housing. Elastomeric bosses, for example, have been incorporated as part of the mounting structure between the spindle motor and the base plate to which the spindle motor is mounted, but have generally had limited success due to wear and fatigue of the bosses. Other prior art schemes involve the use of various gaskets and seals employed between the housing base and cover in an attempt to reduce the level of external vibrations imparted on the data storage system housing and to reduce the levels of acoustic noise generated by the system. Such gaskets and sealing methods generally require special installation procedures as any appreciable misalignment or mis-installation of the gasket could compromise the efficacy of the housing seal. Also, the shock isolation methods and apparatus associated with prior art data storage system housings are generally direction sensitive, and thus provide limited attenuation of vibrations emanating from a plurality of sources and directions. Further, conventional shock attenuation apparatus are often bulky, and are generally not suitable for use within the compact housing environment of small and very small form factor data storage systems.

SUMMARY OF THE INVENTION

The present invention is a vibration isolation apparatus and method for attenuating vibrations in a data storage system housing. A spindle motor assembly is mounted to a secondary base which is decoupled from a primary base of the housing. A compliant member is disposed between the secondary base and primary base, and attenuates spindle motor induced vibrations that would otherwise be transmitted to the primary base and the actuator assembly. In one embodiment, the actuator assembly is mounted to a tertiary base which is also isolated from the primary base by a compliant member. The novel vibration isolation apparatus also provides for the dampening of external shock vibrations impinging on the housing of the data storage system.

BRIEF DESCRIPTION OF THE DRAWINGS

FIG. 4 is a table of empirical data illustrating the amplification effect on vibrations impinging upon the housing base and spindle motor of a data storage system produced from accelerating a supporting table upon which the data storage system is situated;

DETAILED DESCRIPTION OF THE PREFERRED EMBODIMENTS

Figure 1:
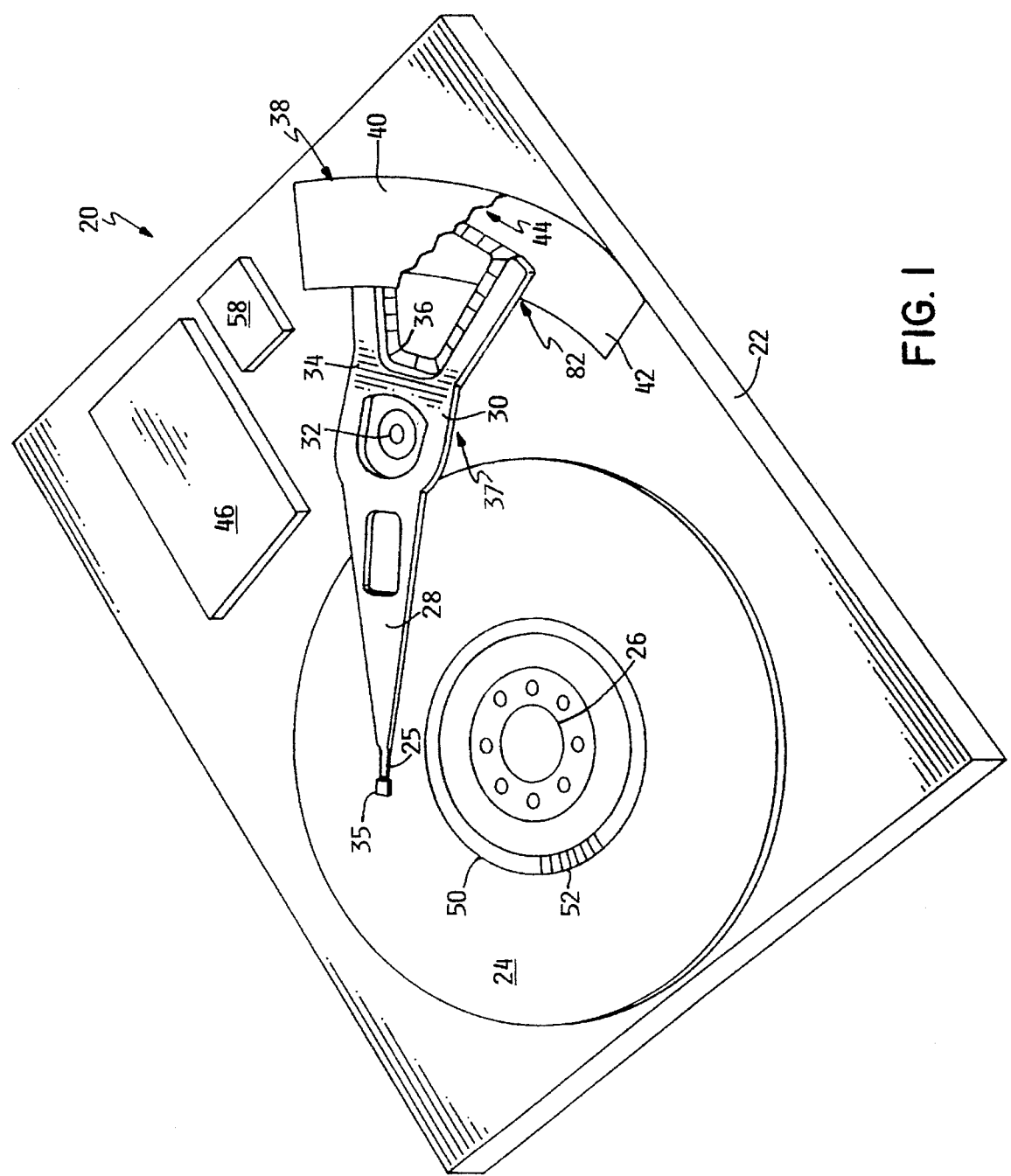
FIG. 1 is a top perspective view of a data storage system with its upper housing cover removed.
Figure 2:
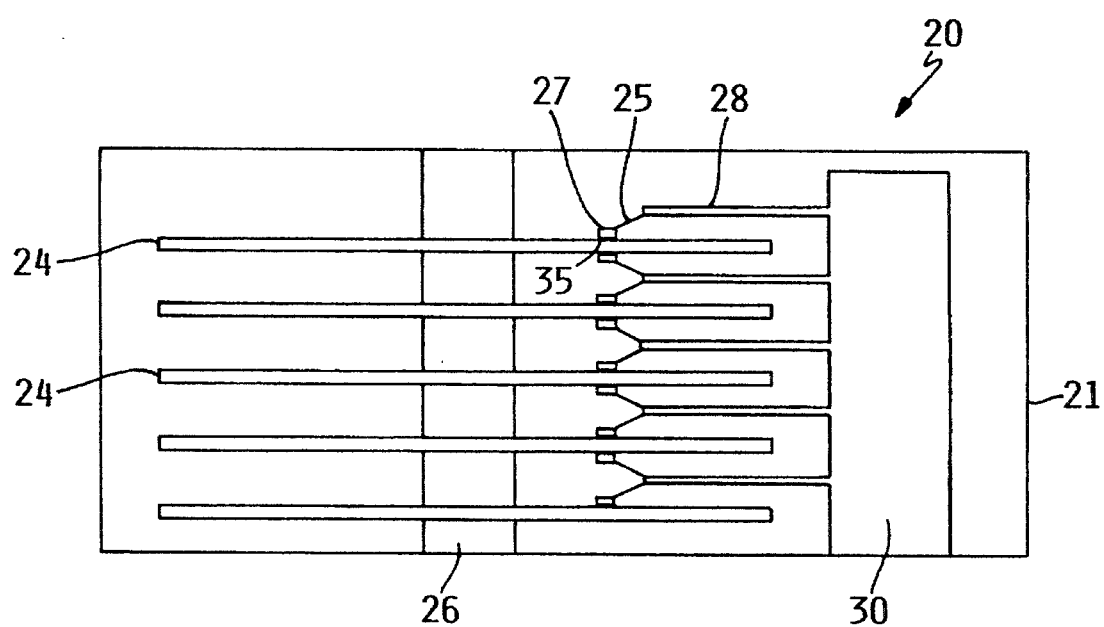
FIG. 2 is a side plan view of a data storage system comprising a plurality of data storage disks.

Referring now to the drawings, and more particularly to FIGS. 1 and 2, there is shown a data storage system 20 having one or more rigid data storage disks 24 stacked coaxially in a tandem spaced relationship which rotate about a common spindle motor 26 at a relatively high rate of rotation. Each disk 24 is typically formatted to include a plurality of spaced concentric tracks 50, with each track being partitioned into a series of sectors 52. The disks 24 may alternatively be formatted to include one or more spiraled tracks.

An actuator 30 typically includes a plurality of interleaved actuator arms 28, with each arm having at least one transducer 35 mounted thereon for reading and writing information onto the data storage disks 24. The actuator 30 is usually mounted to a stationary actuator shaft 32, and rotates thereon to move the actuator arms 28 and transducers 35 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38, causing the actuator arms 28 and transducers 35 to sweep over the surfaces of the data storage disks 24. The spindle motor 26 typically comprises a poly-phase a.c. motor or, alternatively, a d.c. motor energized by a power supply 46 for rotating the data storage disks 24.

The coil assembly 36 and the upper and lower magnet assemblies 40 and 42 of the permanent magnet structure 38 operate in cooperation as an actuator voice coil motor (VCM) 82 responsive to control signals produced by a controller 58. The actuator VCM 82 produces a torquing force on the actuator coil frame 34 when control currents of varying direction and magnitude flow in the coil assembly 36 in the presence of a magnetic field produced by the permanent magnet structure 38. The torquing forces imparted on the actuator coil frame 34, in turn, cause corresponding rotational movement of the actuator arms 28 and transducers 35 in directions dependent on the polarity of the control currents flowing in the coil assembly 36. A controller 58 preferably includes control circuity that coordinates the transfer of data to and from the data storage disks 24, and cooperates with the actuator VCM 82 to move the actuator arms 28 and transducers 35 to prescribed track 50 and sector 52 locations when reading and writing data to the disks 24.

Figure 3:
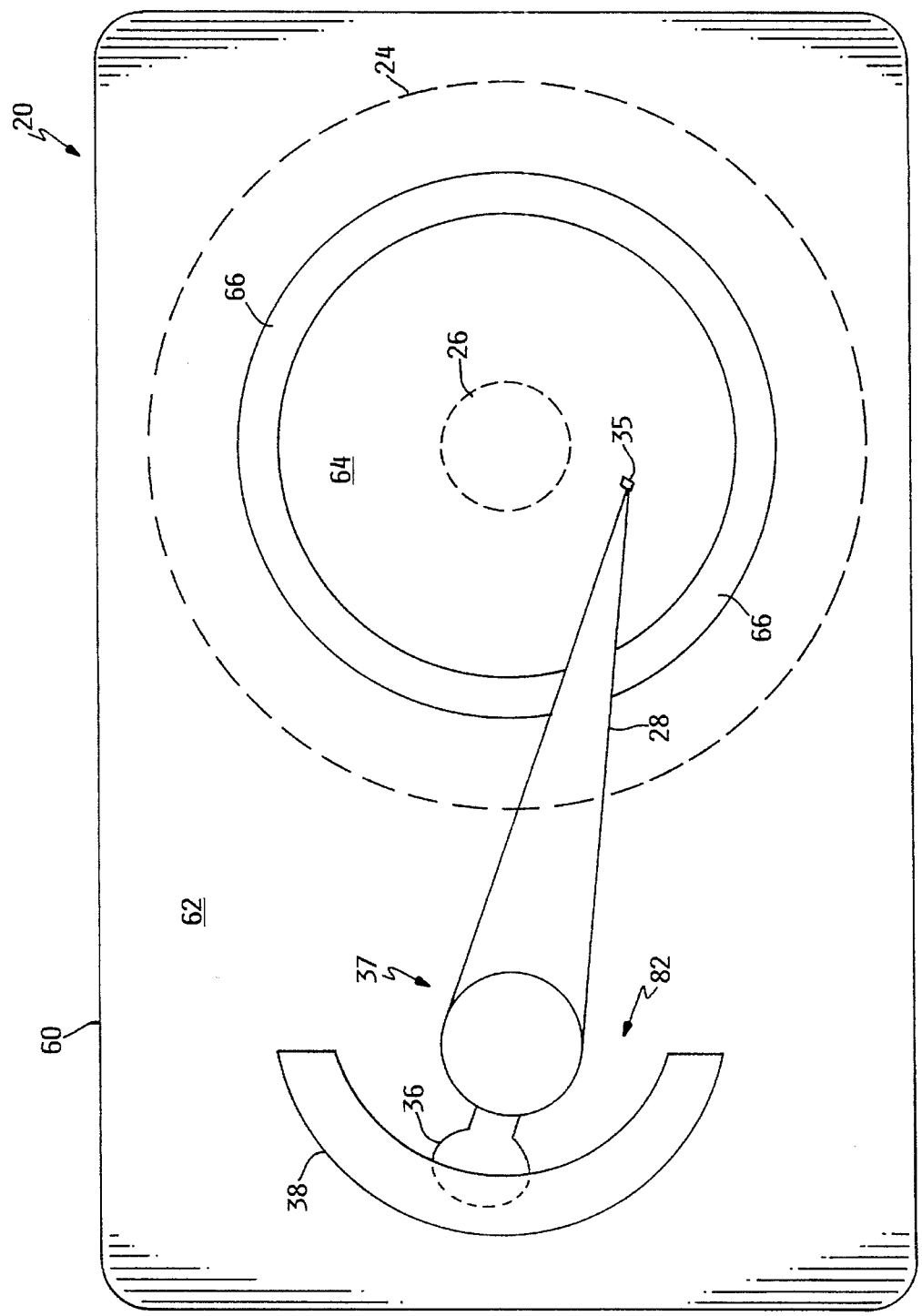
FIG. 3 is a top plan view of a data storage system employing a novel spindle motor shock isolation apparatus.

Turning now to FIG. 3, there is shown one embodiment of a novel vibration isolation apparatus and method employed in the housing base 60 of a data storage system 20. The housing base 60 is illustrated as a composite structure incorporating a primary base 62 and a secondary base 64. In the embodiment illustrated in FIG. 3, the spindle motor 26 is preferably mounted to the secondary base 64. A first compliant member 66 is disposed between the secondary base 64 and primary base 62, and preferably encompasses the secondary base 64. The secondary base is preferably substantially circular, although it is understood that other geometries may be employed. The first compliant member or joint 66 provides for the effective decoupling of the secondary base 64 from the primary base 62. It is believed that the novel shock isolation apparatus will effectively protect the spindle motor 26 against sustained and short duration shock vibrations associated with accelerations on the order of 1,000 g to 2,000 g. The novel vibration isolation apparatus further substantially dampens or virtually eliminates spindle motor 26 excitation vibrations that would otherwise be transmitted to the data storage system housing 21, amplified by the housing 21, and emitted as undesirable acoustic noise. Accordingly, higher spindle motor 26 and disk stack 24 rotational speeds can be achieved with little or no additional acoustical noise being transmitted into the surrounding environment.

Referring now to FIG. 4, there is shown tabulated empirical data illustrating the amplification effect on external vibrations or accelerations imparted to the housing and internal structures and components of a data storage system 20. In general, external vibrations are significantly amplified by the housing 21 structure and by the system components which are mechanically coupled to the housing 21. Varying levels of control vibration were applied to a supporting table upon which the data storage system was situated. For each level of vibration applied to the table, the table acceleration and resulting housing base 22 and spindle motor assembly 26 accelerations were determined, and tabulated in FIG. 4. The empirical data strongly suggests that external vibrations impinging on the data storage system housing 21 are significantly amplified by the housing base 22 structure, and are further amplified by the spindle motor 26 assembly which is mechanically coupled to the base 22.

An external acceleration of approximately 200 g applied to the table supporting the data storage system 20, for example, is amplified to approximately 400 g when measured along the housing base 22. The external table acceleration of 200 g is further intensified to approximately 490 g when measured at the spindle motor 26 assembly. The empirical data further suggests that the magnitude of base 22 and spindle motor assembly 26 induced accelerations increase exponentially with respect to the external accelerations applied to the table supporting the data storage system 20. External vibrations associated with a table acceleration of approximately 400 g, for example, results in measured base 22 accelerations on the order of 900 g, and spindle motor assembly 26 acceleration values on the order of 1600 g.

This four-fold amplification of external accelerations recorded for the spindle motor assembly 26 indicates that appreciable levels of deleterious acceleration can result from relatively moderate levels of external housing 21 vibration. It is well understood by those skilled in the art that even moderate levels of external data storage system housing 21 vibration and acceleration can result in track misregistration errors and read/write errors of varying severity, fatigue of the spindle motor assembly 26, and reduction in the service life of the spindle motor 26. The vibration isolation apparatus and method of the present invention substantially reduces or attenuates the externally induced structural vibrations within the data storage system housing 21 that would otherwise result in unacceptable levels of accelerations imparted to the spindle motor assembly 26 and other components of the data storage system 20. The novel vibration isolation apparatus additionally protects the spindle motor assembly 26 from short duration shock vibrations typically resulting from dropping or bumping the data storage system 20. It is believed that short duration external shock vibrations associated with accelerations on the order of 1,000 g to 2,000 g can be attenuated to non-detrimental or inconsequential levels before impinging on the spindle motor assembly 26.

In addition to providing vibration isolation between the spindle motor assembly 26 and the housing base 60, the novel vibration isolation apparatus and method of the present invention provides for the significant reduction of acoustic noise produced by the spindle motor assembly 26. In a prior art data storage system housing, for example, structural vibrations associated with the rotation of the spindle motor 26 and disk stack 24, and the operation of the actuator voice coil motor 82, are transmitted through the housing base 22 and amplified by the cover 23 as undesirable acoustic noise. The novel vibration isolation apparatus effectively attenuates spindle motor 26 excitation vibrations and, in one embodiment, actuator voice coil motor 82 excitation vibrations that would otherwise be amplified and transmitted by the data storage system housing 21.

Figure 5:
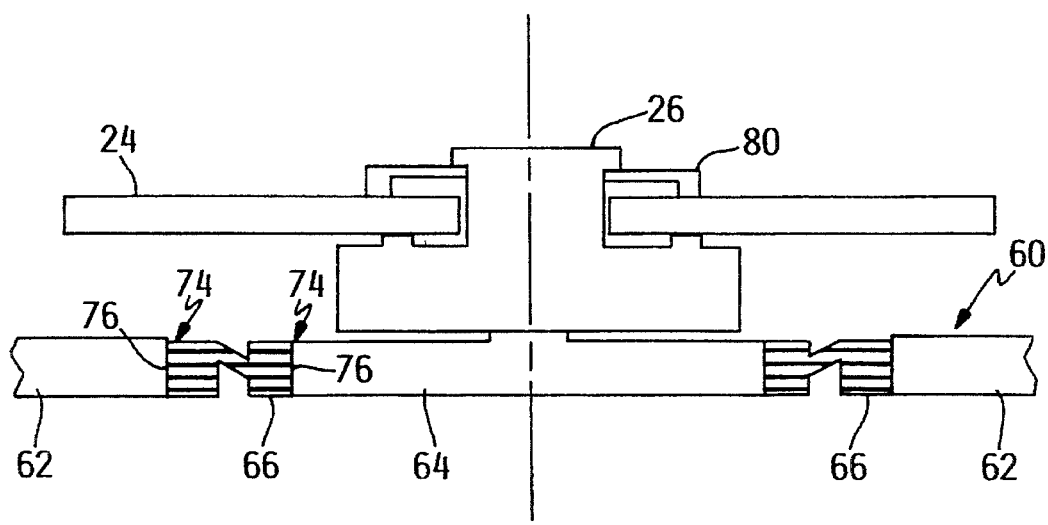
FIG. 5 is a cross-sectional view of a novel spindle motor shock isolation apparatus incorporated into the base of a data storage system housing.

Turning now to FIG. 5, there is shown a cross-sectional illustration of the embodiment illustrated as a top plan view in FIG. 3. In this embodiment, the housing base 60 comprises a primary base 62 and a secondary base 64. A first compliant member 66 preferably encompasses the secondary base 64. The spindle motor assembly 26 is preferably mounted to the secondary base 64, with the actuator assembly 37 and other components of the data storage system 20 being mounted to the primary base 62. It is to be understood that other system 20 components may be mounted to the secondary base 64 in addition to the spindle motor assembly 26. The first compliant member 66, disposed between the primary base 62 and secondary base 64, effectively attenuates vibrations associated with spindle motor 26 rotation and excitations which would otherwise be transmitted to the primary base 62. Further, external vibrations imparted on the data storage system housing 21 and transmitted to the base 62 are also attenuated or dampened by the first compliant member 66.

Figure 6:
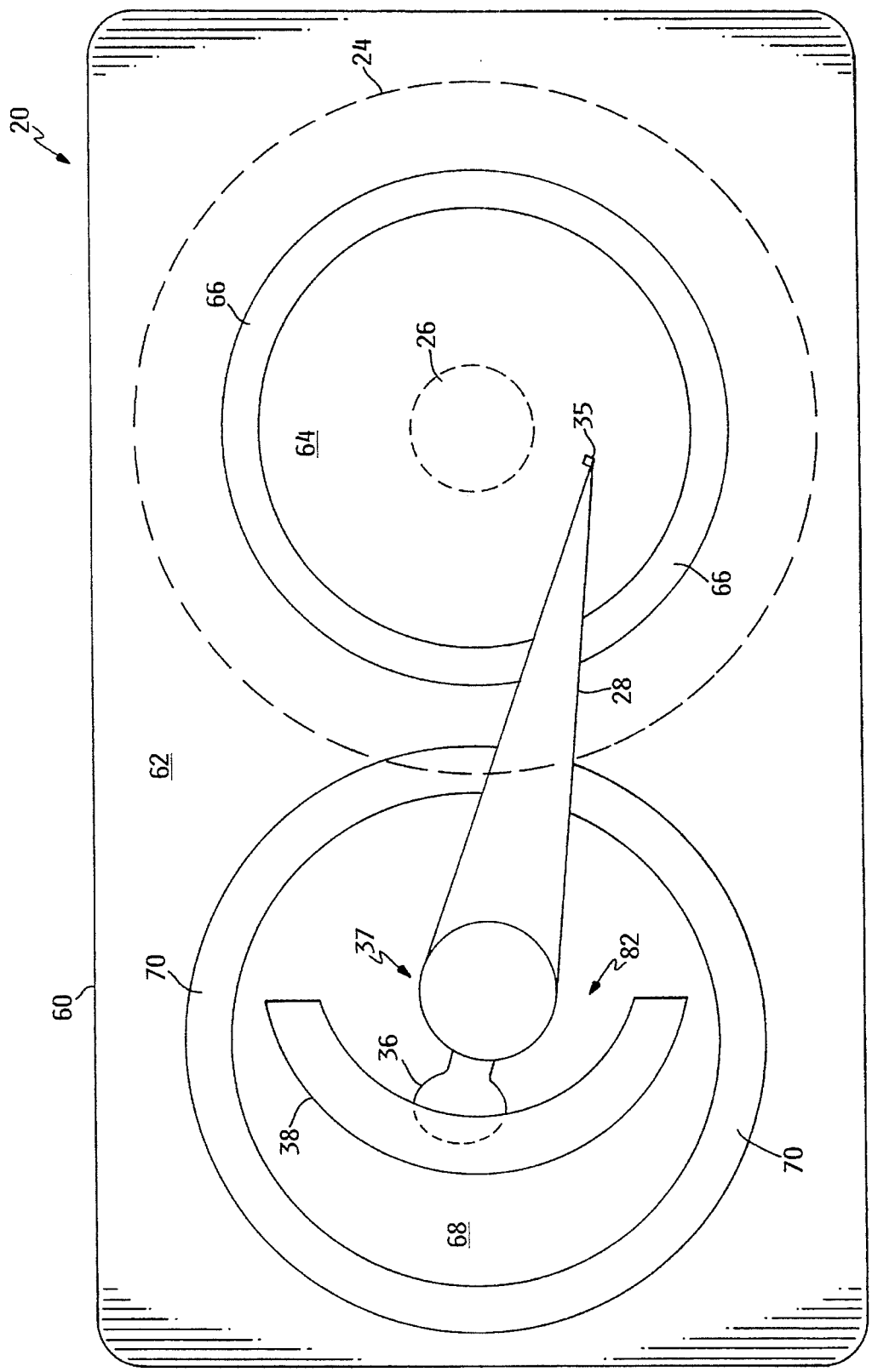
FIG. 6 is a top plan view of one embodiment of the novel shock isolation method and apparatus employed for attenuating spindle motor and actuator assembly vibrations.
Figure 7:
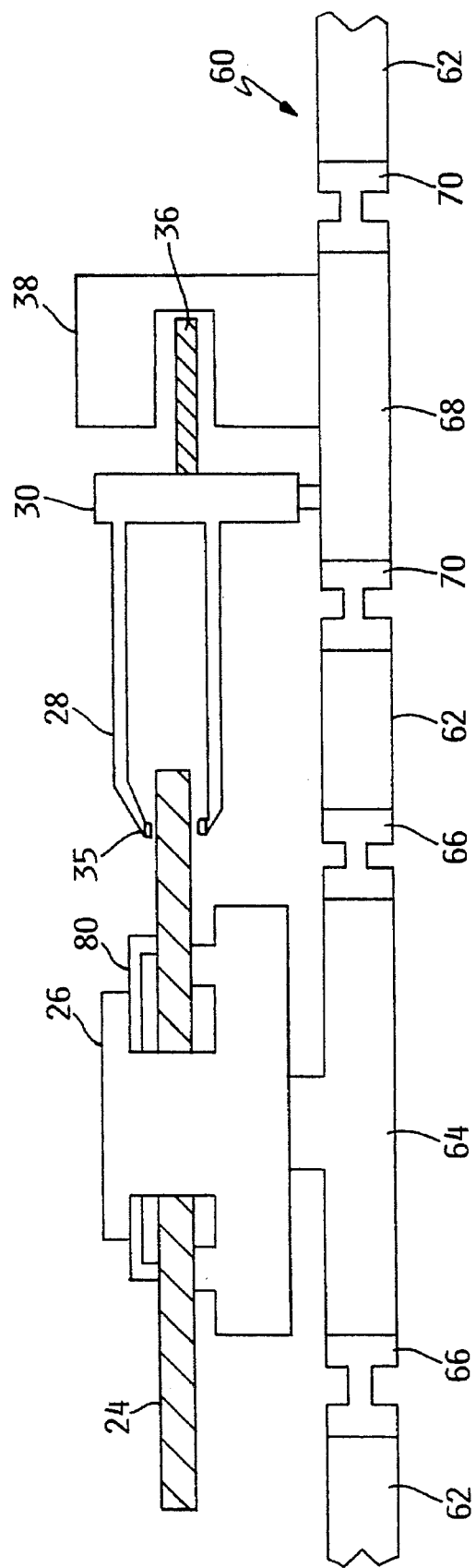
FIG. 7 is a cross-sectional illustration of a novel shock isolation method and apparatus incorporated into a data storage system housing base.

In another embodiment, as shown in FIGS. 6 and 7, the base 60 of the data storage system housing 21 preferably includes a tertiary base 68 in addition to the secondary base 64. The tertiary base 68 is preferably isolated from the primary base 62 by a second compliant member 70, and the secondary base 64 is isolated from the primary base 62 by the first compliant member 66. The tertiary base 68 is preferably adapted for receiving the actuator assembly 37, including the permanent magnet structure 38 and rotatably mounted actuator 30. It is noted that the coil assembly 36 and permanent magnet structure 38 operate in combination as an actuator voice coil motor 82 which controls the acceleration and positioning of the actuator arms 28 and transducers 35 as they sweep into and out of the stack of rotating disks 24.

The second compliant member 70 preferably encompasses the tertiary base 68 and provides vibration isolation between the tertiary base 68 and the primary base 62. Similarly, the first compliant member 66 preferably encompasses the secondary base 64 providing vibration isolation between the primary base 62 and the spindle motor assembly 26 mounted to the secondary base 64. The first and second compliant members 66 and 72 are respectively shown in FIG. 7 as having a substantially H-shaped cross-sectional configuration, although other configurations may be utilized, such as those depicted in FIGS. 13–15.

The employment of the first and second compliant members 64 and 68 illustrated in FIGS. 6 and 7 provides for the effective mechanical decoupling of, and vibration isolation between, the spindle motor 26 assembly and actuator assembly 37. The vibrations associated with spindle motor 26 and actuator assembly 37 excitations typically produce structural resonance respectively in the secondary base 64 and tertiary base 68. Similar structural resonance in prior art data storage system housings has been associated with the production of undesirable vibrations having frequencies that often interfere with the operation of the closed-loop servo control system typically employed to position and align the transducers 35 over specified track 50 and sector 52 locations on the data storage disks 24. The frequencies of these structural vibrations often fall within a range of frequencies associated with normal servo control system operation. As such, these vibrations are often detected and interpreted by the servo control system as constituting valid information used when positioning and aligning the transducers 35 while reading and writing data to the data storage disks 24, thereby inducing varying degrees of track misregistration and read/write errors.

The undesirable spindle motor 26 excitation vibrations associated with prior art data storage system housings 21 are effectively attenuated by employing the vibration isolation apparatus and methodology of the present invention. The first compliant member 66 encompassing the secondary base 64, for example, is preferably fabricated from polymeric material having properties which can be modified to attenuate undesirable structural vibration frequencies while providing sufficient rigidity to ensure the integrity of the data storage system housing base 60. The properties of the polymeric material used to fabricate the compliant members 66 and 70 can preferably be modified to attenuate particular ranges of resonant frequencies transmitted through the secondary base 64 and tertiary base 68, respectively, by properly altering the dimensions, cross section, durometer, constituent fillers, and other physical characteristics of the compliant member material.

For example, a spindle motor 26 mounted to a housing base 22 of a typical data storage system 20 generally produces mechanical resonance in the housing base 22 ranging between approximately 120 hertz to 800 hertz during normal spindle motor 26 operation. Such mechanical resonance is typically associated with friction and mechanical irregularities within the bearing assembly used to facilitate the relatively high rates of spindle motor 26 rotation, typically on the order of several thousand RPM, for example. The first compliant member 66 encompassing the secondary base 64 and the motor spindle assembly 26 preferably attenuates normal spindle motor 26 induced resonant frequencies typically under one kilohertz. Further, by appropriately configuring the size, shape, and material properties of the first compliant member 66, the vibration attenuation or dampening characteristics of the first compliant member 66 may be further altered to accommodate specific data storage system housing 21 configurations and operating characteristics.

Figure 8:
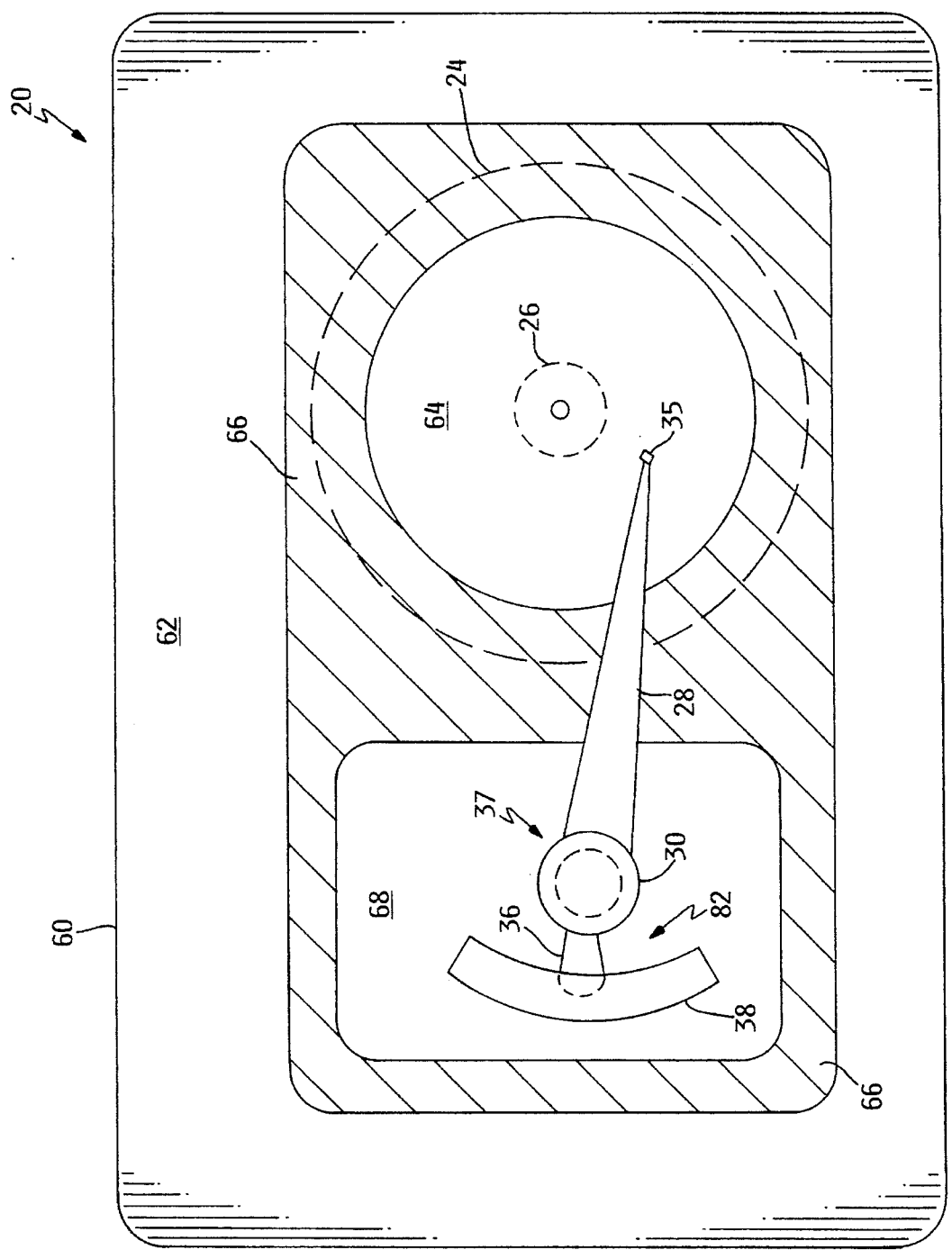
FIG. 8 is another embodiment of the novel motor spindle and actuator assembly shock isolation apparatus and method.
Figure 9:
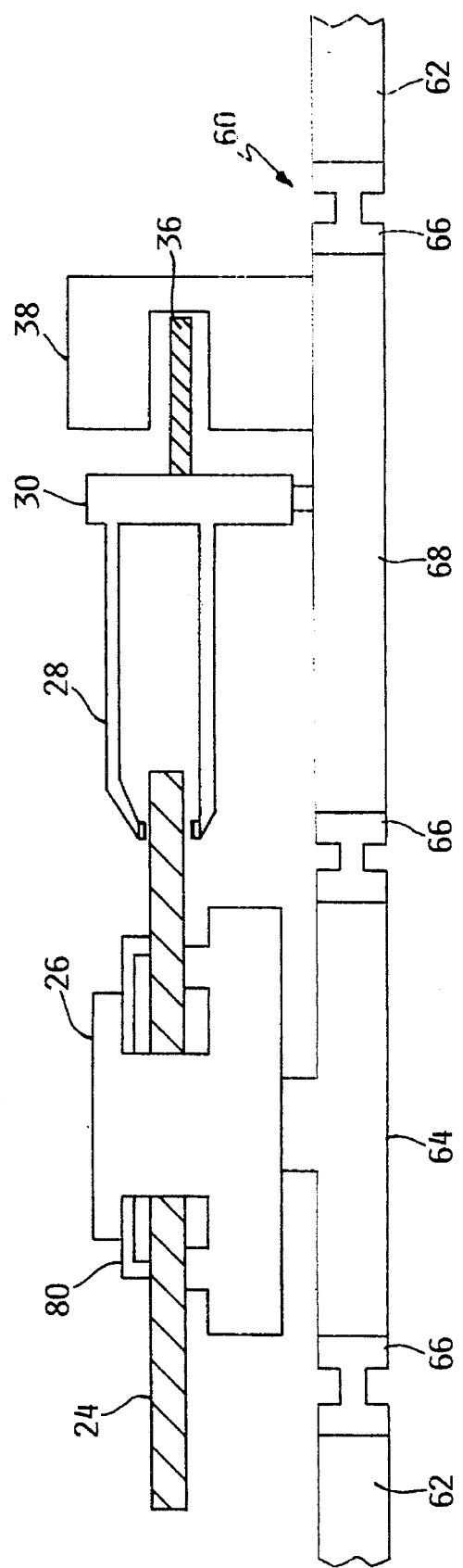
FIG. 9 is a cross-sectional view of an alternative embodiment of a novel spindle motor and actuator assembly shock isolation apparatus and method.
Figure 10:
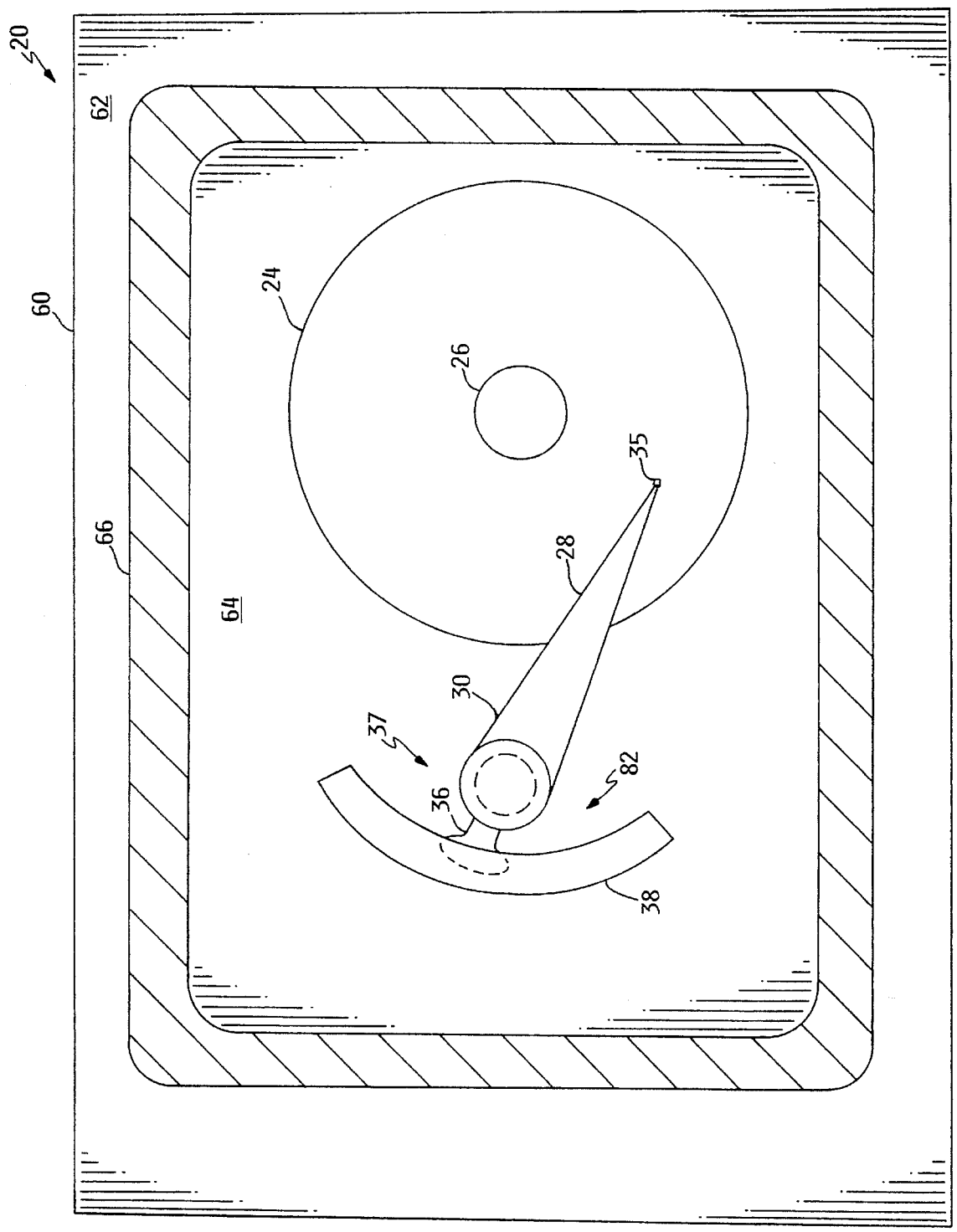
FIG. 10 is another embodiment of the novel shock isolation apparatus and method incorporated into the base of a data storage system housing.

Other embodiments of the novel vibration isolation methodology are shown in FIGS. 8–10. In the embodiment illustrated in FIGS. 8 and 9, a single first compliant member 66 is employed to isolate both the secondary base 64 and tertiary base 68 from the primary base 62 of the data storage system housing 21. In the embodiment illustrated in FIG. 10, the housing base 60 preferably includes a secondary base 64 onto which both the spindle motor assembly 26 and actuator assembly 37 are mounted. The advantages of the embodiment shown in FIG. 10 include ease of manufacture, use of a single mounting structure for both the spindle motor 26 and actuator assembly 37, and vibration isolation between the secondary base 64 and primary base 62. It is to be understood that other components of the data storage system 20 may be mounted on the secondary base 64, tertiary base 68, or the primary base 62.

The compliant members 66 and 70 are preferably fabricated using a polyetheimide polymeric material. One such suitable material is ULTEN 6000/2400 manufactured by General Electric. This material exhibits good humidity ingression resistance, thermal stability, and, importantly, exhibits low out-gassing characteristics. It is well understood by those skilled in the art that the materials employed in the construction data storage system housing 21 must generally introduce little or no gaseous or particulate contaminants into the relatively contaminant-free housing 21 environment. The material selected for fabricating the compliant members 66 and 70 should produce only a minimal, inconsequential level of gaseous or particulate contaminants during the normal service life of the data storage system 20.

The physical and vibration attenuation characteristics of the compliant members 66 and 70 are preferably modifiable by the addition of carbon fillers, glass fibers, and other fillers to the substantially polymeric, compliant material. In general, the mechanical characteristics of the compliant member 66 and 70 should provide adequate rigidity to ensure the structural integrity of the housing base 60. A compliant member having an excessively low durometer, for example, may provide insufficient stiffness for maintaining structural stability between the secondary base 64 and primary base 62, which may result in excessive spindle motor 26 off-axis movement and track misregistration and read/write errors. An excessively high durometer compliant member, however, may exhibit exceptional structural rigidity, but may not provide sufficient attenuation or dampening of spindle motor 26 excitation vibrations. In general, the structural and vibration attenuation characteristics of the compliant member 66 should be formulated to provide adequate structural housing base 60 rigidity while attenuating spindle motor 26 excitation vibrations below approximately one to two kilohertz.

As the demand for high capacity data storage systems increases, it is anticipated that data storage disk track densities will continue to increase, as well as the rotational rates of the spindle motor 26 and data storage disks 24. It is believed that the effective decoupling of spindle motor 26 mounting base 64 from the actuator assembly 37 mounting base 68, as illustrated in FIGS. 6 and 7, will provide for highly accurate transducer-to-track registration required for positioning and aligning the transducers 35 over data storage disks 24 having track densities on the order of 10,000 tracks-per-inch. Employment of the novel vibration isolation housing apparatus provides a mechanically stabile housing base 60 structure for mounting the spindle motor assembly 26 and actuator assembly 37 of a data storage system 20, and effectively attenuates or filters out undesirable resonant frequencies in the housing base 60 that could otherwise interfere with the operation of the closed-loop servo control system.

Another advantage of the present invention concerns the attenuation of short duration shock vibrations typically produced when dropping or bumping the data storage system housing 21. The first compliant member 66, disposed between the secondary base 64 and primary base 62, protects the spindle motor 26 from significant accelerations associated with very short duration shock vibrations, which typically subside after one to two milliseconds. It is believed that the novel vibration isolation apparatus and method can attenuate short duration shocks associated with spindle motor 26 accelerations on the order of 1,000 g to 2,000 g. It is noted that, unlike prior art shock protection schemes which protect the data storage system from vibrations impinging on the system 20 from only a few specific directions, the present vibration isolation methodology is essentially direction-insensitive.

In a preferred embodiment, the novel vibration isolation housing base 60 illustrated in the Figures is manufactured using an injection molding process for the production of low cost, high volume data storage systems 20. In practice, the spindle motor assembly 26, or a portion of the assembly 26, is mounted to the secondary base 24. In an embodiment in which the actuator assembly 37 is mounted to a tertiary base 68, the actuator assembly 37, or a portion of the assembly 37, is mounted to the tertiary base 68. The primary base 62 is set into the injection mold. The secondary base 64, and the tertiary base 68 if applicable, are positioned in the mold within the aperture of the primary base 62. When placed into the mold, the secondary base 64, tertiary base 68, and primary base 62 are preferably separated from each other by a spacing or gap which, during the injection molding process, is filled in by the injected material. The mold is then closed and clamped shut, typically by a hydraulic clamping mechanism. A fluid, polymeric material is then injected into the mold, filling the gaps between the secondary base 64, tertiary base 68, and primary base 62. After the injection step, the polymeric material is allowed to cure before removing the housing base 60 structure from the mold. A unitary housing base 60 is thus produced by an efficient injection molding process which provides for the high-volume production of data storage system housing base structures 60 at a relatively low expenditure of time and money.

Figure 11:
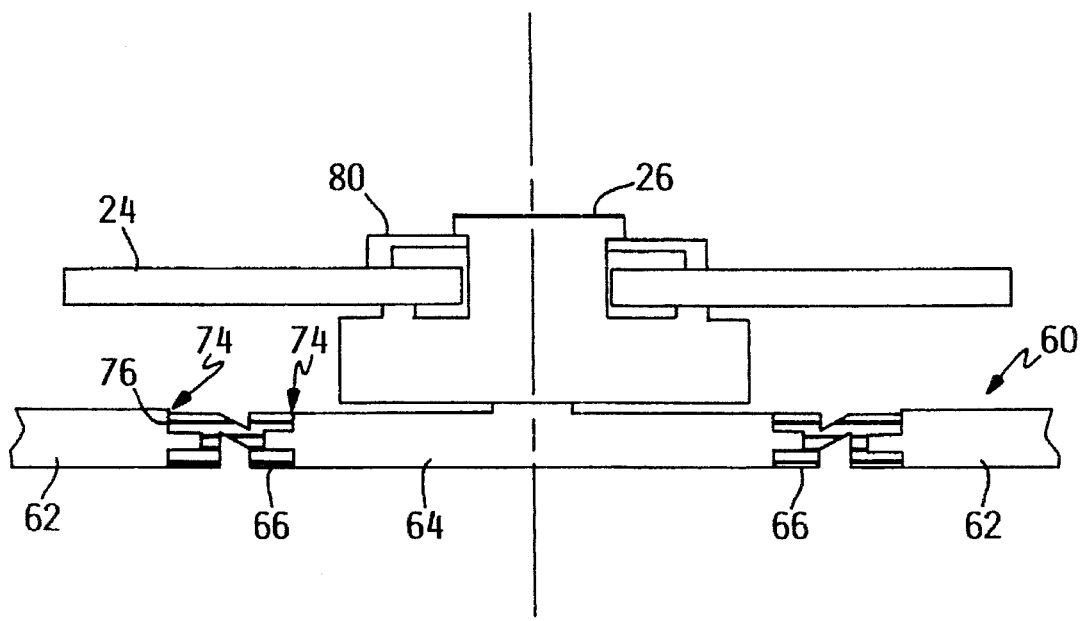
FIG. 11 is a cross-sectional view of another embodiment of the novel spindle motor shock isolation apparatus and method.
Figure 12:
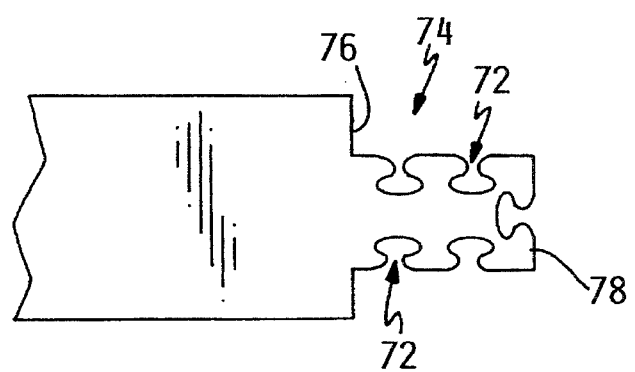
FIG. 12 is an illustration of an attachment interface between a portion of the housing base and a compliant shock isolation element for coupling the compliant element to the base portion.

In FIGS. 11–12, there is shown an embodiment illustrating an attachment scheme for mechanically coupling the compliant member 66 to both the primary base 62 and secondary base 64. The perimeter 76 of the primary base 62 and secondary base 64 preferably includes an outwardly extending attachment ledge 78. The attachment ledge 78 preferably includes a plurality of coupling recesses 72 into which the fluid, polymeric material flows during the injection molding process. The initially fluid material easily flows into the coupling recesses 72 when the material is injected into the mold, but then hardens and becomes mechanically captured within the coupling recesses 72 when cured. In this configuration, near-hermetic sealing at the attachment interface 74 between the primary base 62 and secondary base 64 may be achieved without the use of primers or other chemical adhesives. It is noted that a primer may be initially applied to the perimeter 76 of the primary base 62 and the secondary base 64 to chemically adhere the compliant material to the base perimeter surfaces 76.

In an alternative embodiment, as shown in FIG. 5, the attachment interface 74 may be formed by chemically bonding the compliant member 66 to the base perimeter surfaces 76 of the primary base 62 and secondary base 64. As a step in the injection molding process, a primer may be applied to the base perimeter 76 of both the primary base 62 and secondary base 64 before injecting the polymeric material into the mold. The primer is typically a fluid adhesive material which has the property of bonding two dissimilar materials to one another. After the polymeric material is injected into the mold and begins to cure, the compliant member becomes chemically bonded to the base perimeter surfaces 76 of the primary base 62 and secondary base 64.

Figure 13:
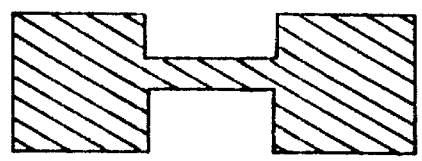
FIG. 13 is a cross sectional view of a substantially H-shaped compliant element of the novel shock isolation apparatus and method.
Figure 14:
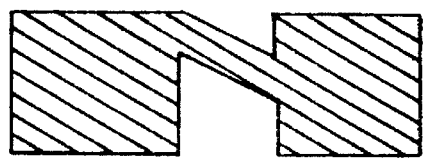
FIG. 14 is a cross-sectional illustrative showing of a substantially N-shaped compliant element employed in a novel shock isolation apparatus and method.
Figure 15:
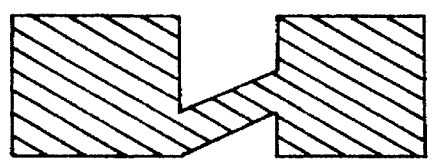
FIG. 15 is a cross-sectional view of a substantially U-shaped compliant element employed in a novel shock isolation apparatus and method for a data storage system.

Depending on the desired frequency attenuation response and structural characteristics of the compliant members 66 and 70, the cross-sectional configuration of the compliant members may be tailored to the particular resonance characteristics of the data storage system housing 21. In FIGS. 13–15, there is shown several embodiments of the compliant members 66 and 70 having various cross-sectional configurations, including a substantially H-shaped cross section, substantially N-shaped cross section, and a substantially U-shaped cross section. It is to be understood that various cross sectional configurations other than those illustrated in FIGS. 13–15 may be employed when fabricating the novel vibration isolation apparatus of the present invention.

It will, of course, be understood that various modifications and additions can be made to the embodiments discussed hereinabove without departing from the scope or spirit of the present invention. For example, rather than employing an injection molding process to fabricate the novel vibration isolation housing base 60, the compliant members 66 and 70 may be pre-fabricated and manually installed onto the housing base 60 to isolate the secondary base 64 and tertiary base 68 from the primary base 62. Additionally, various sealing materials may be employed, such as adhesive primers, to chemically bond the compliant members 66 and 70 to the primary base 62, secondary base 64 and tertiary base 68. Also, aluminum, steel, or other metallic materials, as well as various non-metallic materials, such as high-strength engineering plastics, may be selectively used to fabricate the primary base 62, secondary base 64, and tertiary base 68. Further, the novel vibration isolation apparatus and methodology may be employed to isolate other vibration producing components of the data storage system 20, and may further be incorporated into other housing 21 structures. Accordingly, the scope of the present invention should not be limited by the particular embodiments discussed above, but should be defined only by the claims set forth below and equivalents of the disclosed embodiments.

What is claimed is:

1. A housing assembly adapted for housing a data storage system including a data storage disk, a spindle motor for rotating the data storage disk, and a transducer mounted to an actuator assembly for transferring information to and from the data storage disk, the housing assembly comprising:

a primary housing base;

a secondary housing base, the secondary housing base having the spindle motor mounted thereto; and a compliant element disposed between the primary housing base and the secondary housing base, and encompassing the secondary housing base to operatively couple the primary housing base to the secondary housing base such that the compliant element attenuates vibrations transmitted between the spindle motor and the primary housing base.

2. A housing assembly as claimed in claim 1, wherein the secondary housing base is substantially coplanar with respect to the primary housing base.

3. A housing assembly as claimed in claim 1, wherein the secondary housing base comprises an attachment interface defining a perimeter of the secondary housing base, and the compliant element is bonded to the attachment interface.

4. A housing assembly as claimed in claim 1, wherein the secondary housing base comprises an attachment interface defining a perimeter of the secondary housing base, and the compliant element is mechanically coupled to the attachment interface.

5. A housing assembly as claimed in claim 1, wherein the primary housing base, the secondary housing base, and the compliant element form a substantially rigid integral housing base structure.

6. A housing assembly as claimed in claim 5, wherein the substantially rigid integral housing base structure is fabricated using an injection molding process.

7. A housing assembly as claimed in claim 1, wherein the compliant element has one of a substantially N-shaped, H-shaped, and U-shaped cross-sectional configuration.

8. A housing assembly as claimed in claim 1, further comprising:
 a tertiary housing base, the tertiary housing base having the actuator assembly mounted thereto; and
 a second compliant element disposed between the tertiary housing base and the primary housing base, and encompassing the tertiary housing base to operatively couple the tertiary housing base to the primary housing base such that the second compliant element attenuates vibrations transmitted between the actuator assembly and the primary housing base.

9. A housing assembly as claimed in claim 8, wherein the primary housing base, the secondary housing base, the tertiary housing base, the compliant element and the second compliant element form a substantially rigid integral housing base structure.

10. A housing assembly as claimed in claim 8, wherein the tertiary housing base is substantially coplanar with respect to the primary housing base.

11. A system for storing data comprising:
 a primary housing base;
 a secondary housing base;
 a data storage disk;
 a spindle motor mounted to the secondary housing base adapted for rotating the data storage disk; and
 a compliant element encompassing the secondary housing base and disposed between the primary housing base and the secondary housing base to operatively couple the secondary housing base to the primary housing base and to attenuate vibrations transmitted between the spindle motor and the primary housing base.

12. A system as claimed in claim 11, wherein the secondary housing base is substantially coplanar with respect to the primary housing base.

13. A system as claimed in claim 11, wherein the primary housing base, the secondary housing base, and the compliant element form a substantially rigid integral housing base structure.

14. A system as claimed in claim 11, further comprising:
 a tertiary housing base;
 an actuator assembly, mounted to the tertiary housing base, having a transducer mounted thereon; and
 a second compliant element encompassing the tertiary housing base and disposed between the tertiary housing base and the primary housing base to operatively couple the tertiary housing base to the primary housing base and to attenuate vibrations transmitted between the actuator assembly and the primary housing base.

15. A system as claimed in claim 14, wherein the primary housing base, the secondary housing base, the tertiary housing base, the compliant element and the second compliant element form a substantially rigid integral housing base structure.

16. A system as claimed in claim 14, wherein the tertiary housing base is substantially coplanar with respect to the primary housing base.

17. A housing assembly for a data storage device, the data storage device including a motor for rotating a component of the data storage device, the housing assembly comprising:
 a substantially rigid housing base, having a first base portion and a second base portion, the second base portion having the motor mounted thereto, the housing base further including a compliant member formed integral to the housing base between the first base portion and the second base portion,
 wherein the compliant member attenuates vibrations transmitted between the motor and the first base portion.

18. A housing assembly as recited in claim 17, wherein the compliant member is comprised of a material having a rigidity sufficient to provide structural stability between the first base portion and the second base portion such that relative movement between the first base portion and the second base portion is below an acceptable threshold.

19. A housing assembly as recited in claim 18, wherein the compliant member attenuates excitations of the motor below approximately one to two kilohertz.

20. A housing assembly as recited in claim 17, wherein the first base portion surrounds the compliant member and the compliant member surrounds the second base portion and wherein the first base portion, the compliant member and the second base portion are formed in a common plane.

* * * * *